US006632523B1

(12) United States Patent
Rosenfeld et al.

(10) Patent No.: US 6,632,523 B1
(45) Date of Patent: Oct. 14, 2003

(54) LOW TEMPERATURE BONDING ADHESIVE COMPOSITION

(75) Inventors: Jerrold C. Rosenfeld, Tonawanda, NY (US); Jerrine L. Neff, Williamsville, NY (US)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/675,469

(22) Filed: Sep. 28, 2000

(51) Int. Cl.[7] ................................................ B32B 27/38
(52) U.S. Cl. ................................ 428/355; 428/355 CN; 428/447; 428/446; 528/21; 528/38; 528/26; 528/28; 525/477
(58) Field of Search .................... 428/355 EP, 355 CN, 428/447, 446; 528/21, 38, 26, 28; 525/477

(56) References Cited

U.S. PATENT DOCUMENTS 5,773,509 A    6/1998  Yoshida et al.
5,935,372 A  * 8/1999  Rojstaczer et al. ......... 156/329
6,190,759 B1 * 2/2001  Johansson et al. .......... 428/209

FOREIGN PATENT DOCUMENTS

| EP | 0 377 194 A2 | 12/1989 | |
| EP | 0 459 809 A1 | 5/1991 | |
| WO | 0034032 | 6/2000 | ............. B32B/7/12 |

* cited by examiner

Primary Examiner—Robert Dawson
Assistant Examiner—Christopher Keehan
(74) Attorney, Agent, or Firm—John G. Flaim; Kevin M. O'Brien; Baker & McKenzie

(57) ABSTRACT

An adhesive composition that bonds at low temperatures is disclosed. The composition is a solution in an organic solvent of a polyimide, an epoxy resin, and a cyanate. The polyimide can be a polyimidesiloxane, made from a dianhydride, an aromatic diamine that does not contain siloxane, and a siloxane diamine. The adhesive composition can be used to make a single layer tape, a coated tape, or a double-sided trilayer tape. The tape can bond an article, such as a chip, to a substrate, such as a circuit board.

23 Claims, No Drawings

LOW TEMPERATURE BONDING ADHESIVE COMPOSITION

CROSS-REFERENCE TO RELATED APPLICATION

This application is related to application Ser. No. 09/676,295, filed of even date by M. Hausladen et al., titled, "Method of Making a Polyimide in a Low-Boiling Solvent."

BACKGROUND OF THE INVENTION

This invention relates to an adhesive composition useful for bonding articles to substrates at relatively low temperatures, especially in microelectronic applications. In particular, it relates to a solution in an organic solvent of a polyimide, an epoxy resin, and a cyanate.

A tape having an adhesive coating on both sides of a carrier film can be used to bond articles, such as microelectronic chips, to substrates, such as circuit boards. The adhesive on the tape should be non-tacky at room temperature so that the tape can be rolled up and easily unrolled. (If the tape is tacky, it must be covered with a release liner, which requires additional equipment to remove in an automated assembly line.) To maximize throughput, the tape should bond to the substrate in a tenth of a second or less at about 120 to about 160° C. and, to prevent the bonded tape from dislodging in hot environments, it should melt at a temperature over about 100° C. At the same time, the adhesive should maintain a strong bond at about 220 to 240° C. so that the bond does not break during subsequent heating operations, such as soldering. It is difficult to make an adhesive composition that meets all of these exacting requirements.

SUMMARY OF THE INVENTION

We have discovered an adhesive composition that is non-tacky at room temperature, will bond in a tenth of a second, melts at a temperature over 100° C., and will retain a strong bond at temperatures from about 220 to about 240° C. The adhesive composition is soluble in organic solvents, so it can be applied as a solution and the solvent can be evaporated to form a coating.

DESCRIPTION OF THE PREFERRED EMBODIMENTS

The adhesive composition is prepared as a solution in an organic solvent of a polyimide, an epoxy resin, and a cyanate.

The Polyimide

The polyimide can be prepared by reacting an aromatic dianhydride with a diamine. Generally, stoichiometric quantities of diamine and dianhydride are used to obtain the highest molecular weight, but the equivalent ratio of dianhydride to diamine can range from 1:2 to 2:1.

Examples of suitable aromatic dianhydrides include:
1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4,4'-biphenyl tetracarboxylic dianhydride(BPDA);
bicyclo-[2,2,2]-octen-(7)-2,3,5,6-tetracarboxylic-2,3,5,6-dianhydride;
thio-diphthalic anhydride;
bis (3,4-dicarboxyphenyl) sulfone dianhydride;
bis (3,4-dicarboxyphenyl) sulfoxide dianhydride;
bis (3,4-dicarboxyphenyl oxadiazole-1,3,4) paraphenylene dianhydride;
bis (3,4-dicarboxyphenyl) 2,5-oxadiazole 1,3,4-dianhydride;
bis 2,5-(3',4'-dicarboxydiphenylether) 1,3,4oxadiazole dianhydride;
bis (3,4-dicarboxyphenyl) ether dianhydride or 4,4'-oxydiphthalicanhydride (ODPA);
bis (3,4-dicarboxyphenyl) thioether dianhydride;
bisphenol A dianhydride (BPADA);
bisphenol S dianhydride;
2,2-bis (3,4-dicarboxyphenyl) hexafluoropropane dianhydride or 5,5-[2,2,2-trifluoro-1-(trifluoromethyl) ethylidene] bis-1,3-isobenzofurandione) (6FDA); hydroquinone bisether dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride;
resorcinol dianhydride;
ethyleneglycol bis(anhydrotrimellitate); and
5-(2,5-dioxotetrahydrol)-3-methyl-3-cyclohexene-1,2-dicarboxylic anhydride.

The dianhydrides can be used in their tetraacid form or as mono, di, tri, or tetra esters of the tetra acid, but the dianhydride form is preferred because it is more reactive. The preferred dianhydride is ODPA because it has been found to give excellent properties. Mixtures of dianhydrides are also contemplated.

The diamine used in preparing the polyimide is preferably aromatic as aromatic diamines give the best properties. Examples of aromatic diamines include:
m- and p-phenylenediamine;
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline; (ODA)
3,4'-oxydianiline;
4,4'-diaminobenzophenone;
3,3',3,4', or 4,4-diaminophenyl sulfone or m,m-, m,p- or p,p- sulfone dianiline;
2,2-bis[4-(4-aminophenoxy)phenyl] sulfone;
2,2-bis[4-(3-aminophenoxy)phenyl] sulfone;
4,4'-diaminodiphenyl sulfide;

3,3'-diaminodiphenyl sulfone (APS);

3,3' or 4,4'-diaminodiphenylmethane or m,m- or p,p-methylene dianiline;

3,3'-dimethylbenzidine;

2,2'-bis[(4-aminophenyl)-1,4-diisopropyl]benzene or 4,4'-isopropylidenedianiline or bisaniline P(BAP);

2,2'-bis[(4-aminophenyl)-1,3-diisopropyl]benzene or 3,3'-isopropylidenedianiline or bisaniline M;

methylene dianiline;

1,4-bis(4-aminophenoxy)benzene;

1,3-bis(4-aminophenoxy)benzene;

1,3-bis(3-aminophenoxy)benzene (APB);

4,4'-bis(4-aminophenoxy)biphenyl;

2,4-diamino-5-chlorotoluene;

2,4-diamino-6-chlorotoluene;

2,2-bis-[4(4-aminophenoxy)phenyl] propane (BAPP);

trifluoromethyl-2,4-diaminobenzene;

trifluoromethyl-3,5-diaminobenzene;

2,2-bis(4-aminophenyl)-hexafluoropropane (6F diamine);

2,2-bis(4-phenoxy aniline) isopropylidene;

2,4,6-trimethyl-1,3-diaminobenzene;

4,4diamino-5,5'-trifluoromethyl diphenyloxide;

3,3'-diamino-5,5'-trifluoromethyl diphenyloxide;

4,4'-trifluoromethyl-2,2'-diamino biphenyl;

2,5-dimethyl-1,4-phenylenediamine (DPD);

2,4,6-trimethyl-1,3-diaminobenzene;

diaminoanthraquinone;

4,4-oxybis[(2-trifluoromethyl)benzeneamine] (1,2,4-OBABTF);

4,4'-oxybis[(3-trifluoromethyl)benzeneamine];

4,4'-thiobis[(2-trifluoromethyl)benzeneamine];

4,4'-thiobis[(3-trifluoromethyl)benzeneamine];

4,4'-sulfoxylbis[(2-trifluoromethyl)benzeneamine];

4,4'-sulfoxylbis[(3-trifluoromethyl)benzeneamine];

4,4'-ketobis[(2-trifluoromethyl)benzeneamine];

4,4'-[(2,2,2-trifluoromethyl-1-(trifluoromethyl)-ethylidine)bis(3-trifluoromethyl)benzeneamine]; and 4,4'-dimethylsilylbis[(3-trifluoromethyl)benzeneamine].

The preferred aromatic diamine is APB as it gives excellent properties. Mixtures of aromatic diamines are also contemplated.

The polyimide is preferably a polyimidesiloxane because polyimidesiloxanes have good processibility and low water absorption. To prepare a polyimidesiloxane, a diamine or dianhydride that contains siloxane groups is included as part of the diamine or the dianhydride. A polyimidesiloxane can be made from about 1 to about 80 wt % siloxane-containing monomers and about 20 to about 99 wt % monomers that do not contain siloxane. Preferably, it is made from about 20 to about 60 wt % siloxane-containing monomers and about 40 to about 80 wt % monomers that do not contain siloxane. The siloxane-containing monomer can be either aromatic or non-aromatic, but non-aromatic monomers are preferred as they are more readily available. Siloxane diamines are preferred to siloxane dianhydrides as they are more readily available. Examples of siloxane diamines that can be used have the formula:

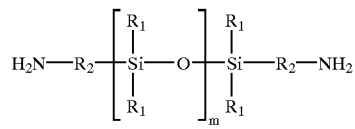

Examples of siloxane dianhydrides that can be used have the formula:

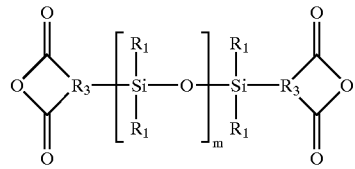

where $R_1$, $R_2$, and $R_3$ are mono, di, and triradicals, respectively, each independently selected from a substituted or unsubstituted 1 to 12 carbon atom aliphatic group or a substituted or unsubstituted 6 to 10 carbon atom aromatic group. Examples of monoradicals include $-CH_3$, $-CF_3$, $-CH=CH_2$, $-(CH_2)_nCF_3$, $-(CF_2)_nCF_3$, $-C_6Hr$, $-CF_2-CHF-CF_3$, and.

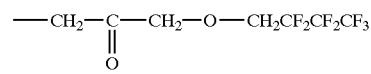

Examples of diradicals include $-(CH_2)_n-$, $-(CH_2)_n-$, $-CF_2-$ and $-C_6H_4-$. Examples of triradicals include $=CH-CH_2-$,

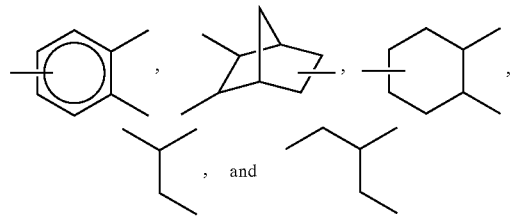

, and where n=1 to 10 and m is 1 to 200, but is preferably 1 to 12. (Siloxane diamines are herein denoted by the notation "$G_m$".) Mixtures of siloxane monomers are also contemplated.

To prepare the polyimide, a solution in an organic solvent is formed of the dianhydride and the diamine. The solvent dissolves the polyamic acid that is initially formed as well as the subsequently formed polyimide. It may be necessary to heat the solvent or use a mixture of solvents as some solvents, such as anisole, do not readily dissolve polyamic acids. Suitable solvents depend upon the particular composition of the polyamic acid that is to be made and dissolved, but may include anisole, N-methyl-2-pyrrolidone (NMP), diglyme, triglyme, cyclohexanone, cyclopentanone, dimethylacetamide, and mixtures of these solvents. The solvent preferably has a boiling point between 130 and 210° C. as lower boiling solvents may evaporate too readily from the adhesive composition and higher boiling solvents may be too difficult to remove from it. Anisole is the preferred solvent for the adhesive composition because it has a low boiling point and low toxicity. It is preferable to prepare the polyimide in anisole; the anisole should be heated to about 140 to about 155° C. to keep the polyamic acid in solution and convert it quickly to the more soluble polyimide. When anisole is used, the dianhydride can be heated to reflux in the anisole and a solution of the diamines can be added over about an hour as water is removed; the reflux/water removal can be continued for an additional 3 hours. Excess solvent can be stripped to give a polymer solution of the desired percent solids and viscosity. Alternatively, the polyimide can be prepared in a solvent other than anisole, precipitated (by pouring into water or methanol with vigorous stirring, for example), dried, and redissolved in anisole or another solvent for use in the adhesive composition. The solution can be about 10 to about 60 wt % solids, but is preferably about 40 to about 50 wt % solids as more dilute solutions mean more solvent to evaporate and more concentrated solutions are too viscous.

The dianhydride and the diamine react readily to form a polyamic acid at room temperature, but higher or lower temperatures can be used. The polyamic acid is then fully (i.e., over 95%) imidized. This can be accomplished chemically by, for example, the addition of acetic anhydride, or by heating, preferably at about 130 to about 170° C.

The Epoxy Resin

Any epoxy resin can be used to prepare the adhesive composition of this invention, including aliphatic epoxies, aromatic epoxies, and cycloaliphatic epoxies. Preferably, the epoxy resin should have retain a strong bond between about 220 to about 240° C. Aromatic epoxy resins and epoxy resins that are solid at room temperature are preferred as they give stronger bonds and non-tacky films.

Examples of aliphatic epoxy resins include:
1,4-bis(2,3-epoxypropoxy) butane;
1,2-bis(2,3-epoxy-2-methyl-propoxy) ethane;
1,3-bis[3-(2,3-epoxypropoxy)propyl] tetramethyldisiloxane;
1,2,3-tris(2,3-epoxypropoxy) propane; and
2,2-bis(2,3-epoxypropoxymethyl)-1-(2,3-epoxypropoxy) butane.

Examples of aromatic epoxy resins include:
di-2,3-epoxypropyl isophthalate;
di-2,3-epoxypropyl phthalate;
o-(2,3-epoxypropyl)phenyl-2,3-epoxypropyl ether;
1,3-bis-(2,3-epoxypropyl) benzene;
tris-2,4,6-(2,3-epoxypropyl) phloroglucinol;
tris-2,4,6-(2,3-epoxypropyl)methyl-phloroglucinol;
triglycidyl-p-aminophenol;
2,6-(2,3-epoxypropyl)phenyl-2,3-epoxypropyl ether;
4-(2,3-epoxy)propoxy-N,N-bis(2,3-epoxypropyl) aniline;
2,2-bis[p-(2,3-epoxypropoxy)phenyl] propane (bisphenol A epoxy);
2,2-bis[p-(2,3-epoxypropoxyphenyl)] methane (bisphenol F epoxy):
2,2-bis(p-2,3-epoxypropoxy-phenyl)-1,1,1,3,3,3-hexafluoropropane;
2,2-bis[p-(2,3-epoxypropoxy)phenyl] nonadecane;
4,4-bis(2,3-epoxypropyl)phenyl ether;
2,3-epoxypropyl-4,4-bis[p-(2,3-epoxypropoxy)phenyl] pentanoate;
2,2-bis[4-(2,3-epoxypropoxy)-3,5-dichlorophenyl] propane;
2,2-bis[4-(2,3-epoxypropoxy)-3,5-dibromophenyl] propane;
2,4,4'-tris(2,3-epoxypropoxy) biphenyl;
2,2',4,4'-tetrakis(2,3-epoxypropoxy) biphenyl;
tetrakis(2,3-epoxypropoxy)diphenyl methane;
2,2',4,4'-tetrakis(2,3-epoxypropoxy) benzophenone;
3,9-bis[2-(2,3-epoxypropoxy)phenylethyl]-2,4,8,10-tetraoxaspiro [5,5] undecane;
1,1,3-tris[p-(2,3-epoxypropoxy)phenyl] propane; and
1,1,2,2-tetrakis[p-(2,3-epoxypropoxyphenyl] ethane.

Examples of cycloaliphatic epoxies include:
vinylcyclohexenediepoxide;
limonene diepoxide;
(3,4-epoxy-cyclohexylmethyl)-3,4-epoxy-cyclohexane carboxylate;
(3,4-epoxy-6-methyl-cyclohexylmethyl)-3,4-epoxy-6-methylcyclohexanecarboxylate;
ethyleneglycol-bis(4-oxatetracyclo(6.2.1.0$^{2,7}$0$^{3,5}$)hendec-9-yl) ether;
glycerol-bis(4-oxatetracyclo(6.2.1.0$^{2,7}$0$^{3,5}$)hendec-9-yl) ether; (4-oxatetracyclo(6.2.1.0$^{2,7}$0$^{3,5}$)hendec-9-yl) glycidyl ether;
3-(3',4'-epoxycyclohexyl)-9,10-epoxy-2,4-dioxaspiro (5.5)undecane;
3-(3',4'-epoxy-6-methyl-cyclohexyl)-9,10-epoxy-7-methyl-2,4-dioxaspiro(5.5)undecane;
dicyclopentadienediepoxide;
glycidyl-2,3-epoxy-cyclopentylether;
bis(cyclopentenyl)ether diepoxide;
2,3-epoxybutyl-2,3-epoxycyclopentylether;
epoxypentyl-2,3-epoxycyclopentylether;
9,10-epoxystearyl-2,3-cyclopentylether;
3,4-epoxyciclohexylmethyl-2,3-cyclopentylether;
2,2,5,5-tetramethyl-3,4-epoxylcyclohexylmethyl-2,3-cyclopentylether;
2,2,5,5,6-pentamethyl-3,4-epoxycyclopentylether;
2,3-epoxycyclopentyl-9,10-eposystearate;
2,3-epoxycyclopentyl-3,4-epoxycyclohexylcarboxylate;
2,3-epoxycyclopentyl-2,2,5,5-tetramethyl-3,4-epoxycyclohexylcarboxylate;
(3,4-epoxy-2,5-endomethylene-cyclohexylmethyl)-3,4-epoxy-2,5-endomethylene-cyclohexanecarboxylate;
bis(3,4-epoxy-2,5-endomethylene-cyclohexylmethyl) succinate;
bis(3,4-epoxy-2,5-endomethylene-cyclohexylmethyl) formate;
bis(3,4-epoxy-2,5-endomethylene-hexahydrobenzal) pentaerythritol;
3-(3',4'-epoxy-2',5'-endomethylenecyclohexylmethyl)-9,10-epoxy-2,4-dioxaspiro(5.5)undecane;
bis(3-oxatricyclo(3.2.1.0$^{2,4}$)oct-6-yl)carbonate;
bis(3-oxatricyclo(3.2.1.0$^{2,4}$)oct-6-yl)succinate;
(3-oxatricyclo(3.2.1.0$^{2,4}$)oct-6-yl)-3,4-epoxy-cyclohexylcarboxylate;
(3-oxatricyclo(3.2.1.0$^{2,4}$)oct-6-yl)-9,10-epoxy-octadecanoate;
(4-oxatetracyclo(6.2.1.0$^{2,7}$0$^{3,5}$)hendec-9-yl)-2,3-epoxy-butylether;
(4-oxatetracyclo(6.2.1.0$^{2,7}$0$^{3,5}$)hendec-9-yl)-6-methyl-3,4-epoxy-cyclohexylmethylether;
(4-oxatetracyclo(6.2.1.0$^{2,7}$0$^{3,5}$)hendec-9-yl)-3,4-epoxy-cyclohexylether;
(4-oxatetracyclo(6.2.1.0$^{2,7}$0$^{3,5}$)hendec-9-yl)-3-oxatricyclo-(3.2.1.0$^{2,4}$)-oct-6yl-ether;

(4-oxatetracyclo(6.2.1.0$^{2,7}$0$^{3,5}$)hendec-9-yl)-3,4-epoxy-2,5-endomethylene-cyclohexylmethylether;

ethylene glycol-bis(4-oxatetracyclo(6.2.1.0$^{2,7}$0$^{3,5}$)hendec-9-yl) ether;

diethyleneglycol-bis(4-oxatetracyclo(6.2.1.0$^{2,7}$0$^{3,5}$)hendec-9-yl) ether;

1,3-propyleneglycol-bis(3-oxatetracyclo(6.2.1.0$^{2,7}$0$^{3,5}$)hendec-9-yl) ether;

glycerol-bis(4-oxatetracyclo(6.2.1.0$^{2,7}$0$^{3,5}$)hendec-9-yl) ether;

bis(4-oxatetracyclo(6.2.1.0$^{2,7}$0$^{3,5}$)hendec-9-yl) ether;

bis(4-oxatetracyclo(6.2.1.0$^{2,7}$0$^{3,5}$)hendec-9-yl) formate;

bis(4-oxatetracyclo(6.2.1.0$^{2,7}$0$^{3,5}$)hendec-9-yl) succinate;

bis(4-oxatetracyclo(6.2.1.0$^{2,7}$0$^{3,5}$)hendec-9-yl) maleate;

bis(4-oxatetracyclo(6.2.1.0$^{2,7}$0$^{3,5}$)hendec-9-yl) phthalate;

bis(4-oxatetracyclo(6.2.1.0$^{2,7}$0$^{3,5}$)hendec-9-yl) adipate;

bis(4-oxatetracyclo(6.2.1.0$^{2,7}$0$^{3,5}$)hendec-9-yl) sebacate;

tris(4-oxatetracyclo(6.2.1.0$^{2,7}$0$^{3,5}$)hendec-9-yl) trimellitate;

9,10-epoxy-octadecanoic acid-[4-oxatetracyclo-(6.2.1.0$^{2,7}$0$^{3,5}$)hendec-9-yl] ester; and 9,10,12,13-diepoxy-octadecanoic acid-[4-oxatetracyclo-(6.2.1.0$^{2,7}$0$^{3,5}$)hendec-9-yl] ester.

Other types of epoxy resins, such as epoxy silicones, can also be used. The preferred epoxy resin is bisphenol A epoxy as it gives excellent properties. Epoxy silicones and mixtures of epoxy resins are also contemplated.

About 20 to about 100 phr (parts by weight per hundred part by weight of the polyimide) of the epoxy resin should be used as if less is used the bonding temperature may be too high and the adhesive may have poor strength at high temperature; if more is used, the adhesive may absorb moisture, resulting in a less reliable bond. Preferably, about 30 to about 70 phr of the epoxy resin is used.

The Cyanate

The cyanate (also known as a "cyanate ester") is a compound having at least one —OCN groups. Dicyanates (i.e., two —OCN groups), and particularly aromatic dicyanates, are preferred as they are more readily available. Diisocyanates (i.e., compounds having two —NCO groups) have been found to give unsatisfactory properties. Examples of commercially available cyanates include:

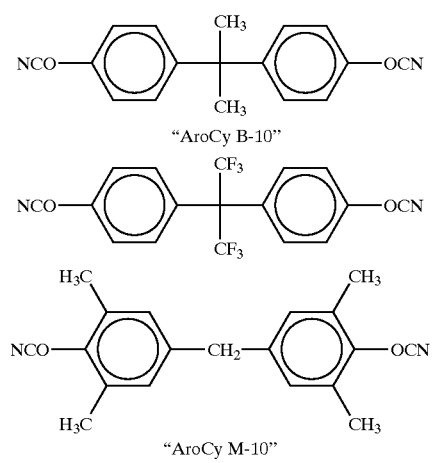

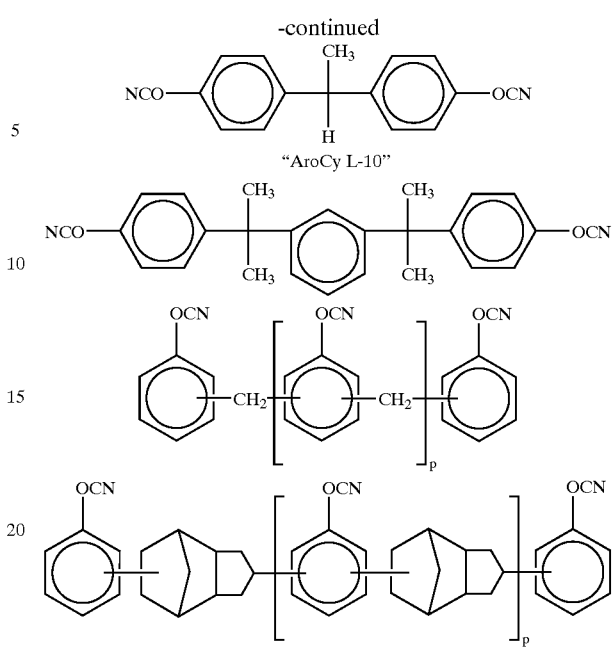

where p is 0 to 20. "AroCy B-10," "aroCy M-10," and "AroCy L-10" are products of Ciba; similar products are made by Lonza. Other cyanates can be prepared by reacting the corresponding phenol with a cyanogen halide (XCN, where X is halogen), as is known in the art. The preferred cyanate is "AroCy L-10" because it has a low melting point. Mixtures of cyanates are also contemplated. About 2 to about 40 phr of the cyanate should be used as if less is used the tape may not bond fast enough for a high speed assembly line and more seems to be unnecessary. Preferably, the amount of cyanate should be about 10 to about 20 phr and the equivalents of —OCN groups on the cyanate to epoxy groups on the epoxy resin is about 0.3 to about 1.2 because theoretically one epoxy group can react with one cyanate group.

Optional Components

In addition to the polyimide, the epoxy resin, and the cyanate, the adhesive may contain certain optional ingredients. For example, it preferably contains about 0.5 to about 10 phr of a coupling agent to increase adhesion. About 5 to about 90 phr of a thermally conductive filler, such as boron nitride or aluminum nitride, or an electrically and thermally conductive filler, such as silver, can be included if desired. For increased rigidity and to lower the coefficient of thermal expansion, about 20 to about 80 phr silica can included. Thickeners, such as fumed silica, clay, or organic waxes or polymers may be useful also. Fumed silica can reduce friction between the layers of tape and can also reduce blocking, i.e., the tendency of layers of tape to stick together after being in contact for some time.

Preparation and Use

The adhesive can be used as a solution of about 20 to about 60 wt % solids. If the solution has less solids, its viscosity may be too low to apply easily and an insufficient amount of solids may be deposited to achieve the desired coating thickness after drying. If the solution has more solids, it may be too viscous to be spread uniformly by a doctor blade. A viscosity of about 1000 to about 5000 cps and a solution of about 35 to about 50 wt % solids are preferred.

The solution of the adhesive can be spread onto the surface of a substrate, the solvent evaporated to form a coating, preferably about 25 to about 200 microns thick, and an article can be bonded to the coating by applying heat and pressure. If the substrate is a release surface, such as polytetrafluoroethylene or polyethylene, the coating, after heating and drying, can be stripped to form a film, which can be used as an adhesive. The composition can also be used as an encapsulant or a protective coating.

Alternatively, a tape can be prepared that has a coating of the adhesive on both sides. The tape can be made by spreading a solution of the adhesive over a carrier film, such as polyimide, polycarbonate, polyethylene, or polypropylene. The carrier film is preferably a polyimide film as it is strong and has good high temperature stability. The carrier film can be about 10 to about 1000 microns thick and is preferably about 20 to about 100 microns thick. The solution can be spread, for example, by using a doctor blade, spin coating, or other suitable means. The solvent can be evaporated to a level below 1000 ppm by, for example, heating at about 70 to about 150° C. An adhesive coating, preferably about 15 to about 20 microns thick, is formed. Additional solution is spread on the opposite side of the carrier film and the solvent is again evaporated, forming a similar adhesive coating. On a production line, the tape is automatically coated and is heated in a series of temperature zones, a process that can require up to about two hours. The resulting three-layer tape is non-tacky at room temperature and can be rolled up and unrolled when used. Applications where no carrier tape is used or only one side of the carrier tape is coated are also contemplated.

To use the three-layer tape, it is cut or punched to the desired dimensions, placed on the substrate, and heated under pressure to a temperature above its melting point, typically about 120 to about 160° C. Generally, the heat is applied through the substrate so that the adhesive does not bond to the heating element. The article to be bonded, is placed over the other side of the adhesive tape and the procedure is repeated. Alternatively, a sandwich can be formed of the substrate-tape-article and a single heating step applied. A post-cure step or some additional heating is desirable to fully cure the thermoset portion of the adhesive. For example, the adhesive, after bonding, can be heated at about 110° C. for about an hour and then at about 165° C. for an hour or more to fully cure it. Also, the tape can be "B-staged," i.e., partially reacted prior to use to decrease cure time.

The following examples further illustrate this invention:

EXAMPLE 1

A polyimidesiloxane (2369 g, a 12 L batch) was prepared by heating ambient anisole (2311 g), toluene (676 g), and 100 mole % ODPA (872 g) to reflux. A solution of 50 mole % APB (410.7 g) and 50 mole % $G_9$ siloxane diamine (MW=about 845, 1188 g) in 54 wt % anisole (2725 g) was added at reflux over about an hour to form a solution of polyimidesiloxane of about 46 wt % solids. The mixture was heated at 150 to 165° C. for 3 hours while removing the water of imidization via a Dean-Starke trap with condenser. About 2260 g of water/toluene/anisole was removed through the Dean Starke trap. The resulting polyimidesiloxane had a MW of 39,000/24,000=1.59 and a percent imidization of 96.1. Solutions in anisole of 40 to 45 wt % solids were prepared from the polyimidesiloxane, various epoxies, and a dicyanate, "AroCy L-10." The following epoxies were used:

| Epoxy | Functionality | weight/epoxy | Approximate melting point (° C.) |
|---|---|---|---|
| Shell "1001F" | 2 | 538 | 79 |
| Shell "836" | 2 | 314 | Semi-solid at RT |
| Shell "1004F" | 2 | 875 | 97 |
| Shell "SU-8" | 8 | 217 | 82 |
| Ciba "GY-2600" | 2 | 188 | Liquid at RT |

The solutions were cast onto a 1 mil thick sheet of polyimide film (sold by Ube as "Upilex") using a 5 mil doctor blade. The film was dried at 100° C. for 10 minutes. The other side of the film was similarly coated and the film was again dried for 20 minutes, but at 110° C. The resulting trilayer tapes were non-tacky at room temperature.

Strips of the dried trilayer tapes ¼ inch wide were cut and placed on small pieces of BT board that had a ⅛ inch diameter hole drilled through the center. The pieces were punched onto a 120° C. heater block with about 15 psi pressure for 0.1 seconds. The pieces were picked up by the strips of film and shaken by hand to determine if the bond would hold. If the bond did not hold, the bonding was repeated at longer times until it held. Once the bond held, a piece of silicone wafer about 0.5 by 0.5 cm, which simulated a chip, was applied to the opposite side of the tape directly over the hole in the BT board using the same bonding equipment but at 225° C. for 0.25 seconds. The strength of the bond was measured using a meter that pushed against the silicone wafer through the hole in the BT board until the bond failed. The pressure at failure was measured in grams.

The following table gives the adhesive compositions tested and the results of the tests:

| Example | Epoxy | Epoxy (phr) | "AroCY L-10" | Tape attach time at 120° C. (sec) | Pressure at failure (g) |
|---|---|---|---|---|---|
| 1 | 836 | 50 | 10 | 0.1, 0.1, 0.1, 0.1, 0.1 | 600, 650, 500 |
| 2 | 1004F/836 | 25/25 | 10 | 0.25 | 425 |
| 2a | 1001F | 70 | 20 | 0.1, 0.1, 0.1 | 600 |
| 3 | 1001F | 50 | 10 | 0.25 | 300 |
| 4 | 1001F | 50 | 16.7 | 0.1, 0.25, 0.25 | >1000, 1000 |
| 4a | 1001F | 70 | 10 | 0.1, 0.1, 0.1, 0.1 | 650 |
| 4b | 1001F | 70 | 10[2] | 0.25, 0.25, 0.25, 0.25 | 933 |
| 5 | SU-8 | 50 | 10 | >0.1 | — |
| 5a | SU-8 | 70 | 20 | 0.25, 0.25, 0.1, 0.25 | 975 |
| 6 | GY-2600 | 50 | 10 | (1) | — |
| 7 | 836 | 50 | 0 | 0.25 | 450, 560 |
| 8 | 836 | 50 | 5 | 0.25 | 740 |
| 9 | 836 | 50 | 15 | 0.1 | >1000, 830 |
| 10 | 836 | 50 | 20 | 0.1 | 700, >1000 |
| 11 | 836 | 30 | 5 | 0.5 | 250 |
| 12 | 836 | 30 | 10 | 0.25 | 300 |
| 13 | 836 | 70 | 10 | 0.1, 0.1, 0.1 | 450, 300, >1000 |
| 14 | 836 | 70 | 20 | 0.1, 0.1, 0.1 | 700, 550, 550 |
| 15 | 836 | 50 | 10[2] | 0.25, 0.50, 0.25, 0.25, 0.25 | 936 |
| 16C | 1001F | 70 | 17.5[3] | 10, 10, 10, 10 | 630 |

[1]Films stuck together after coating

| Example | Epoxy | Epoxy (phr) | "AroCY L-10" | Tape attach time at 120° C. (sec) | Pressure at failure (g) |
|---|---|---|---|---|---|

(2)Used "M-10"
(3)Used diphenylmethanediisocyanate sold by Bayer as "Mondur ML"

These examples show that the adhesive compositions of this invention will attach very quickly at 120° C. The "836" epoxy resin worked well but at high levels (>50 phr) tended to cause the tape to stick to itself either immediately after being made or after storage at room temperature. The ratio of epoxy resin to "L-10" was found to be best when 10 to 20 pbw "L-10" was used with 50 pbw "836." Attach times were longer when 30 pbw "836" were used, but at 70 pbw "836" and 20 pbw "L-10" a short attach time was achieved. Example 16C is a comparative example and shows that diisocyanates give unacceptably slow attach times.

EXAMPLES 17 TO 20

Example 1 was repeated using different polyimidesiloxanes, 50 phr epoxy resin, and 16.7 phr "AroCY L-10." The following polyimidesiloxanes were used:

| Example | Polyimidesiloxane (moles) | Aromatic Diamine (moles) | Siloxane Diamine (moles) |
|---|---|---|---|
| 17 | ODPA (0.1188) | APB (0.0451) | $G_9$ (0.0535) $G_1$ (0.0202) |
| 18 | BPDA (0.1240) | TDA (0.0938) | $G_9$ (0.0302) |
| 19 | BPADA (0.0335) | APB (0.0301) | $G_9$ (0.0027) $G_1$ (0.0006) |
| 20 | ODPA (0.0335) | APB (0.0301) | $G_9$ (0.0027) $G_1$ (0.0006) |

The attach time was 0.1, 0.1, and 0.1 for Example 17 and >10 for Examples 18 to 20. The attachments failed in Examples 18 to 20, but the formulations can be adusted to avoid failure by adding more epoxy or more siloxane. Examples 18 to 20 were acceptable for use as coating adhesives.

We claim:

1. A composition comprising a solution in an organic solvent of (A) a polyimide;
(B) an epoxy resin; and
(C) a cyanate,
wherein the polyimide is a polyimidesiloxane polymerized from a dianhydride, an aromatic diamine, that does not contain siloxane, and an aliphatic siloxane-containing diamine and wherein the polyimide, epoxy resin and the cyanate form an adhesive composition.

2. A composition according to claim 1 wherein said aliphatic siloxane containing diamine has the general formula

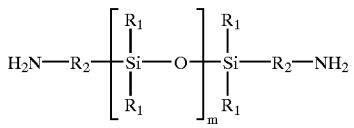

where $R_1$ and $R_2$ are mono and diradicals, respectively, each independently selected from a substituted or unsubstituted 1 to 12 carbon atom aliphatic group or a substituted or unsubstituted 6 to 10 carbon atom aromatic group, and m is 1 to 200.

3. A composition according to claim 1 wherein said dianhydride is oxydiphthalic anhydride.

4. A composition according to claim 1 wherein said aromatic diamine that does not contain siloxane is 1,3-bis (3-aminophenoxy)benzene.

5. A composition according to claim 1 wherein said epoxy resin is bisphenol A epoxy.

6. A composition according to claim 1 wherein said cyanate is selected from the group consisting of

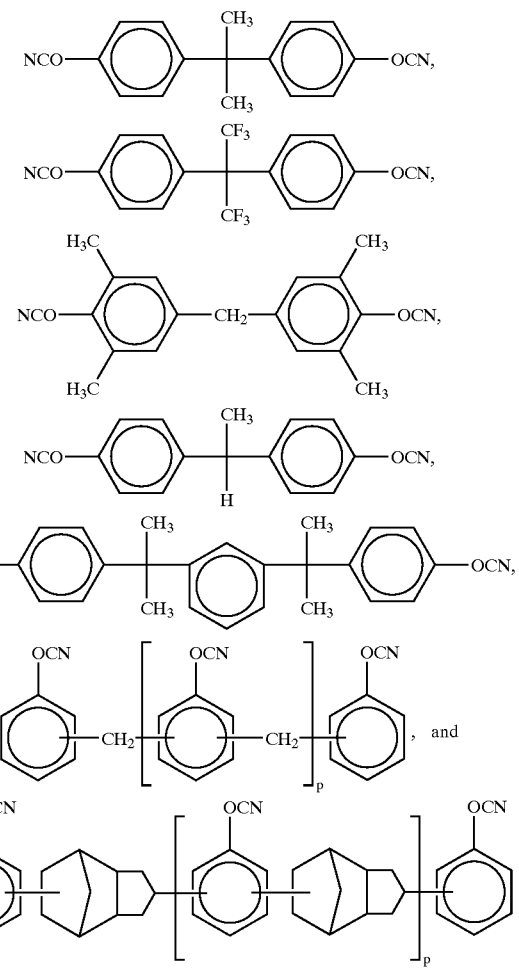

where p is 0 to 20.

7. A composition according to claim 1 wherein said solvent is anisole.

8. A substrate coated with a composition according to claim 1.

9. A method of bonding an article to a substrate comprising applying a composition according to claim 1 to said substrate, evaporating said organic solvent to form a coating on said substrate, pressing said article against said coating, and heating said coating.

10. An article bonded to a substrate made according to the method of claim 9.

11. A method of making a film comprising coating a release surface with a composition according to claim 1, heating said composition until it is non-tacky, and removing said composition from said release surface.

12. A method of making an adhesive tape comprising applying a composition according to claim 1 to one side of a carrier film, forming a coating thereon and evaporating said organic solvent from said coating.

13. A method according to claim 12 including the additional steps of applying a composition according to claim 1 to the other side of said carrier film, forming a second coating thereon, and evaporating said organic solvent from said second coating.

14. A double-sided adhesive tape made according to the method of claim 13.

15. A method of bonding an article to a substrate comprising pressing a double-sided adhesive tape according to claim 14 against said substrate, heating said double-sided adhesive tape, pressing said article against said double-sided adhesive tape, and heating said double-sided adhesive tape.

16. An article bonded to a substrate according to the method of claim 15.

17. An adhesive composition comprising a solution of about 20 to about 50 wt % solids in an organic solvent of
(A) a polyimidesiloxane made from
  (1) aromatic dianhydride;
  (2) diamine in an equivalent ratio to said aromatic dianhydride of about 1:2 to about 2:1, said diamine comprising
    (a) about 20 to about 99 wt %, based on total monomer, aromatic diamine that does not contain siloxane; and
    (b) about 1 to about 80 wt %, based on total monomer, aliphatic siloxane diamine having the general formula

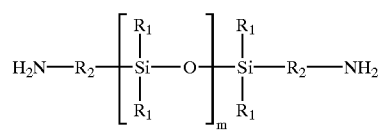

where $R_1$ is methyl, $R_2$ is propyl, and m is 1 to 12;
(B) about 20 to about 100 phr solid aromatic epoxy resin; and
(C) about 2 to about 40 phr dicyanate selected from the group consisting of

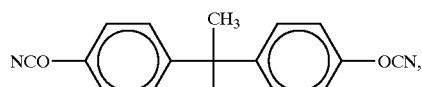

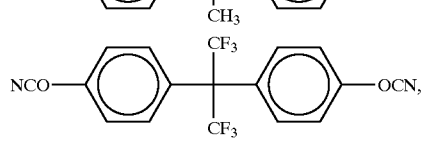

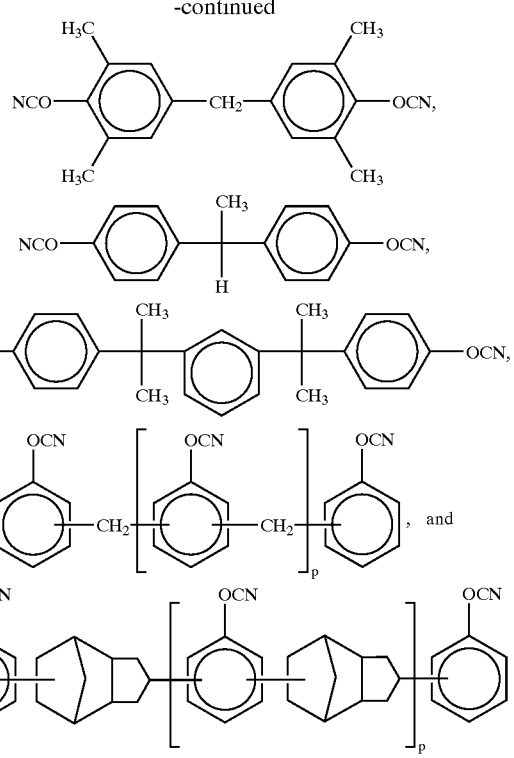

where p is 0 to 20.

18. An adhesive composition comprising a solution of about 30 to about 40 wt % solids in anisole of
(A) a polyimidesiloxane made from
  (1) oxydiphthalic anhydride;
  (2) diamine in an equivalent ratio to said oxydiphthalic anhydride of about 1:2 to about 2:1, said diamine comprising
    (a) about 40 to about 80 wt % 1,3-bis(3-aminophenoxy)benzene; and
    (b) about 20 to about 60 wt % diamine having the general formula

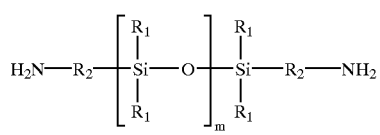

where $R_1$ is methyl, $R_2$ is propyl, and m is 1 to 12;
(B) about 30 to about 70 phr solid aromatic epoxy resin; and
(C) about 10 to about 20 phr dicyanate selected from the group consisting of

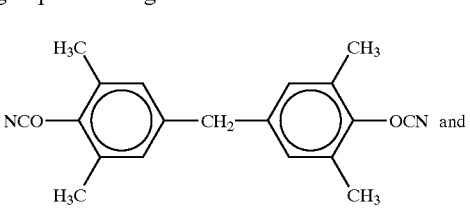

-continued

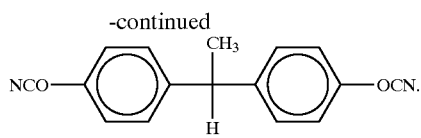

19. The composition according to claim 1, wherein the adhesive composition is non-tacky at room temperature.

20. The composition according to claim 1, wherein the adhesive composition is capable of bonding in a tenth of a second.

21. The composition according to claim 1, wherein the adhesive composition is capable of retaining a strong bond at temperatures from about 220° C. to about 240° C.

22. An adhesive composition comprising a solution of about 20 to about 50 wt % solids in an organic solvent of
    (A) a polyimidesiloxane made from an aromatic dianhydride and a diamine;
    (B) about 20 to about 100 phr solid aromatic epoxy resin; and
    (C) about 2 to about 40 phr dicyanate.

23. An adhesive composition comprising a solution of about 30 to about 40 wt % solids in anisole including:
    (A) a polyimidesiloxane made from an aromatic dianhydride and a diamine;
    (B) about 30 to about 70 phr solid aromatic epoxy resin; and
    (C) about 10 to about 20 phr dicyanate.

* * * * *

UNITED STATES PATENT AND TRADEMARK OFFICE
CERTIFICATE OF CORRECTION

PATENT NO. : 6,632,523 B1
DATED : October 14, 2003
INVENTOR(S) : Rosenfeld et al.

It is certified that error appears in the above-identified patent and that said Letters Patent is hereby corrected as shown below:

Column 2,
Line 17, delete "4oxadiazole" and insert in lieu thereof -- 4 oxadiazole --;

Column 3,
Line 22, delete "4diamino" and insert in lieu thereof -- 4'-diamino --;

Column 4,
Line 23, delete "Hr" and insert in lieu thereof -- $H_5$ --;

Column 5,
Line 27, delete "have";

Column 8,
Line 51, delete "can included" and insert in lieu thereof -- can be included --;

Column 9,
Line 38, delete "bonded,is" and insert in lieu thereof -- bonded, is --;

Column 13,
Line 52, delete "R, is methyl, R2" and insert in lieu thereof -- $R_1$, is methyl, $R_2$ --;

Column 14,
Line 53, delete "R," and insert in lieu thereof -- $R_1$ --;

Signed and Sealed this

Thirtieth Day of December, 2003

JAMES E. ROGAN
*Director of the United States Patent and Trademark Office*